United States Patent [19]

Ledlow et al.

[11] Patent Number: 4,465,220
[45] Date of Patent: Aug. 14, 1984

[54] DEVICE FOR SUPPORTING WELD UNDERBEAD

[75] Inventors: Jimmie E. Ledlow, Renton; Paul M. Stoops, Seattle, both of Wash.

[73] Assignee: The Boeing Company, Seattle, Wash.

[21] Appl. No.: 479,430

[22] Filed: Apr. 25, 1983

Related U.S. Application Data

[63] Continuation of Ser. No. 91,025, Nov. 5, 1979, abandoned.

[51] Int. Cl.³ .............................................. B23K 5/22
[52] U.S. Cl. ...................................... 228/50; 269/48.1; 254/134.4
[58] Field of Search .................... 269/48.1, 43, 49; 228/50, 49 B, 216; 254/134.4, 134.3 FT; 15/104.3 SN, 104.3 G, 104.06, 104.05; 72/370

[56] References Cited

U.S. PATENT DOCUMENTS

| | | | |
|---|---|---|---|
| 2,281,918 | 5/1942 | Constant et al. | 15/104.06 R |
| 2,792,626 | 5/1957 | Chyle | 228/216 |
| 2,794,197 | 6/1957 | Crane | 254/134.4 |
| 3,960,311 | 6/1976 | Griffiths | 228/49 B |
| 4,084,739 | 4/1978 | Koltz et al. | 269/48.1 |
| 4,103,816 | 8/1978 | Scholtus et al. | 228/49 B |
| 4,150,775 | 4/1979 | Roden et al. | 228/50 |

FOREIGN PATENT DOCUMENTS 1060669  11/1953  France .............................. 254/134.4

Primary Examiner—Robert C. Watson
Attorney, Agent, or Firm—B. A. Donahue; Morris A. Chase

[57] ABSTRACT

An elastomeric mandrel has a shallow groove around the outer diameter. A woven sleeve of ceramic fiber surrounds the mandrel; which in turn is covered with a woven sleeve of fiberglass. The mandrel with coverings is inserted into tubing to be joined by welding with the shallow groove positioned under the joint. The mandrel is diametrically expanded by means located outside of the tubing to press the coverings against the inside of the tubing during time of welding, and the height of the weld underbead is controlled by the groove in the mandrel acting as a mold.

3 Claims, 7 Drawing Figures

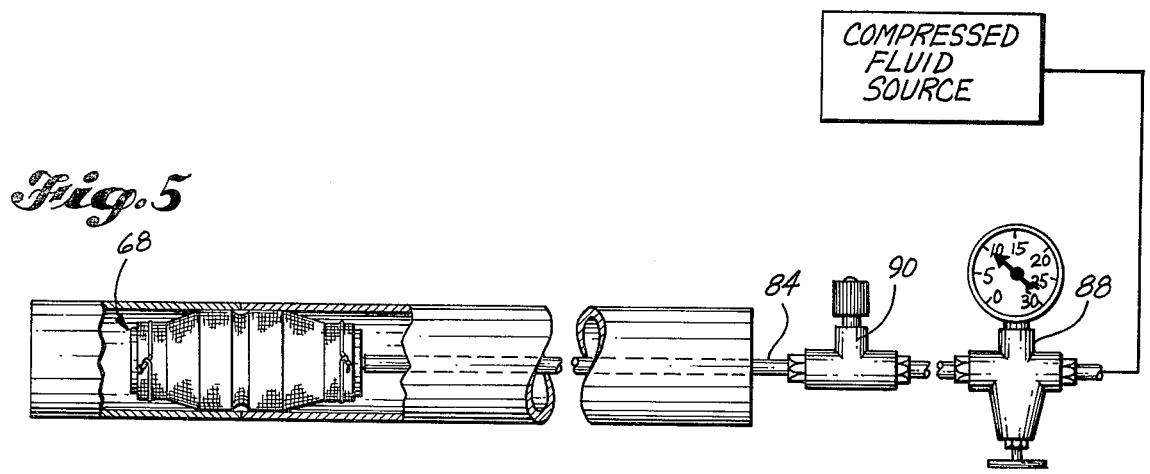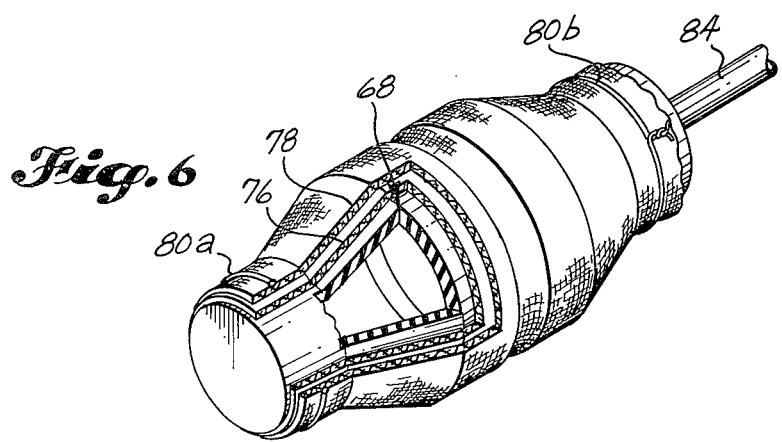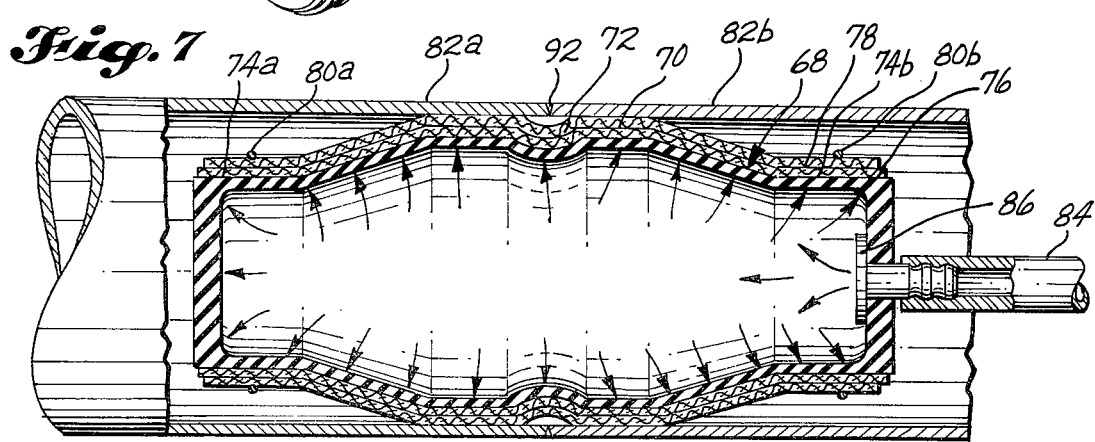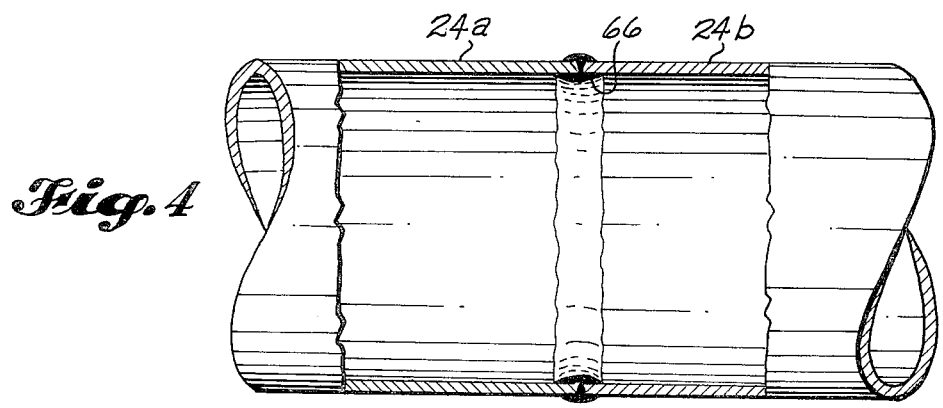

DEVICE FOR SUPPORTING WELD UNDERBEAD

This is a continuation, of application Ser. No. 091,025, filed Nov. 5, 1979 now abandoned.

BACKGROUND OF THE INVENTION

Weld underbeads in aluminum are usually large and frequently extend below the lower material surface a distance equal to three or more times the material thickness. On girth welds in some flow critical tubular weldments, the typically large underbeads tend to create a fluid flow restriction. Consequently, the underbead will require the utilization of some form of underbead support tooling or mechanical removal of the excessive weld reinforcement. Mechanical weld reinforcement removal is a slow, costly, manual operation and is frequently difficult or impossible due to the inaccessability of the weld underbead area produced by bends in the tubular detail parts. Occasional part rejection also occurs as a result of cutter slippage during the metal removal operations. The conventional approach to the problem of excessive weld underbead size is containment of the underbead by a metalic expandable, internal tooling. However, this approach is very expensive due to the high cost of each individual tool and the large inventory of tooling required to accommodate the multiplicity of girth weld diameters and weldment configurations. The metallic internal tooling approach is frequently design restricted since each tool will only accommodate a narrow range of girth diameters and tolerances, mechanical actuation and tooling installation and removal may be difficult or impossible, and noncircular joints substantially increase tooling complexity and fabrication costs.

It was found that the underbead may be controlled with a nonmetallic containment device.

SUMMARY OF THE INVENTION

An elastomeric mandrel is covered with a pair of woven fiber sleeves that are expandable. The mandrel with sleeves is insertable into various sizes of aluminum tubing. The mandrel is diametrically expandable from a control unit outside the tubing that communicates with the mandrel. The expanded mandrel presses the covering material firmly against the inside ends of tubing to be joined by welding. The mandrel has a shallow groove around its outer periphery located to be positioned under the joint. This groove limits the height of the underbead during the welding.

It is an object of this invention to provide a device for controlling the height of the underbead buildup during welding of aluminum tubing.

It is another object of this invention to provide a device for controlling underbead height of buildup in tubing that is not straight throughout its length.

It is yet another object of this invention to provide a method of positively controlling the underbead height of a weld in aluminum tubing.

DESCRIPTION OF THE DRAWINGS

FIG. 4 shows a side elevational view in section of a joint welded by the use of this invention.

FIG. 5 shows a different embodiment of this invention in a side elevational view.

FIG. 6 shows a perspective view of the mandrel partially in section of this embodiment of the invention.

FIG. 7 shows a blown-up side elevational view, in section, of the inserted mandrel.

DETAILED DESCRIPTION

Figure 1:
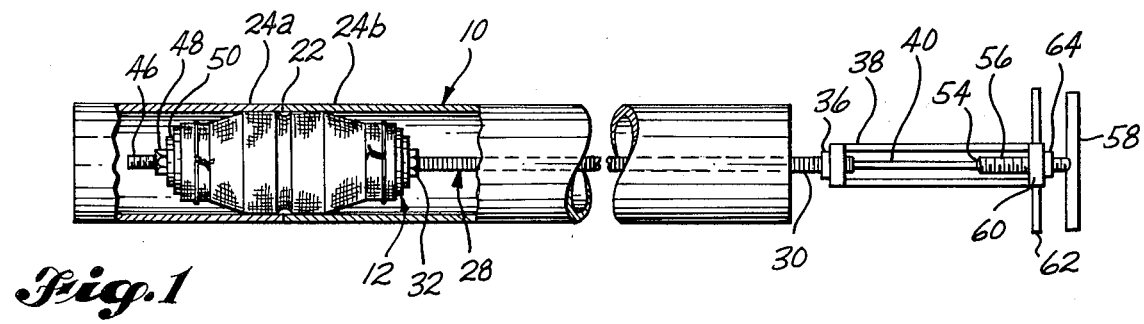
FIG. 1 shows a side view partially in section of the device of this invention inserted in tubing to be welded.
Figure 2:
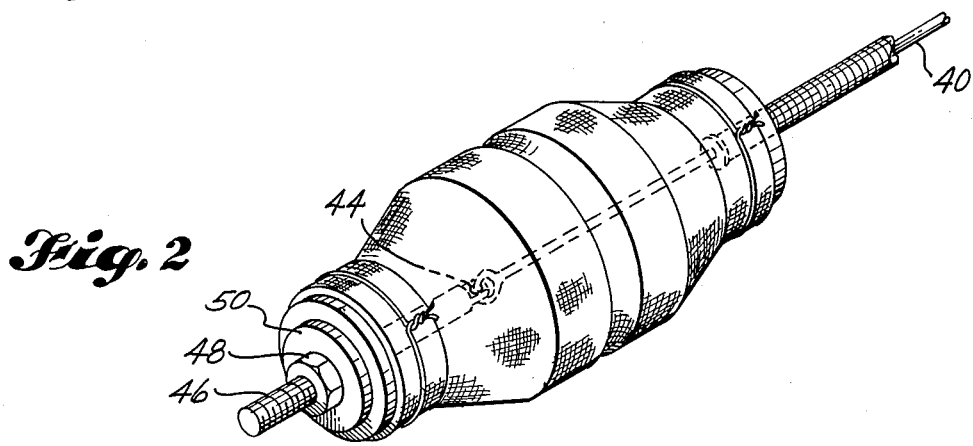
FIG. 2 shows a perspective view of the mandrel part of the device of this invention.
Figure 3:
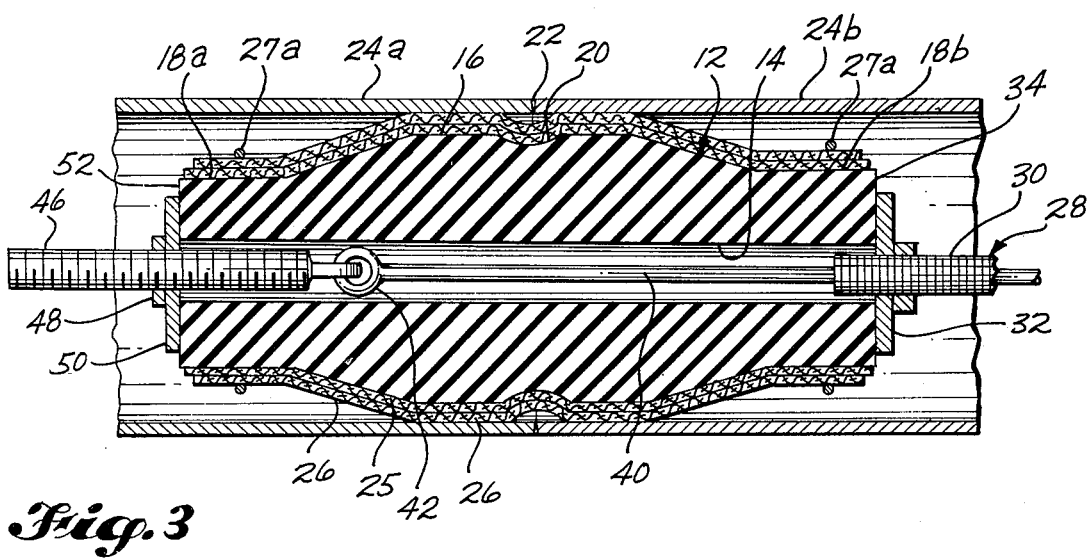
FIG. 3 shows a side elevational view of the inserted mandrel of FIG. 1 with the view blown-up and the mandrel and coverings in section.

In underbead control device 10, a solid elastomeric mandrel 12 has an opening 14 extending axially throughout its length. This may be of any high temperature elastomeric material with a material of silicone rubber preferred. The mandrel is shaped to suit the interior shape of the aluminum being welded. In tubing it preferably has a larger diameter 16, near the middle and a smaller diameter 18a and 18b near the end. This facilitates inserting and removing of the mandrel even around bends in the tubing. Located in the larger diameter 16 is a shallow groove 20 this groove is shaped to be located under a joint 22 formed by tubing ends 24a and 24b to be welded. It will be circular in shape for tubing abutting at 90°, and will be eliptical in shape for tubing abutting at a different angle. This mandrel is covered with a double layer of protective sleeving. Various types of high temperature resistant sleeve materials may be used. However, it is preferred that the inner layer 25 be of a ceramic fiber material such as amorphous silica. This inner sleeve, made from seamless, woven, textile fabric acts as a heat shield for the elastomeric mandrel. The outer layer 26 is preferably from fiberglass made from seamless, woven, textile fabrics. These sleeves being of woven fabrics permit them to stretch or to contract along with the mandrel. The sleeves are secured to the mandrel using a loop of lock wire 26a and 26b located near the ends of the mandrel at diameters 18a and 18b.

In this embodiment the mandrel with cover layers is radially expanded by axially compressing the mandrel. This axial compression is accomplished from outside the tubing to be welded. A Bowden wire 28 permits transmitting a longitudinal motion. The spiral wire casing 30 of the Bowden wire is joined at one end to a ferrule 32; which in turn abuts end 34 of the mandrel, and the casing is joined, by fastener 36, at its other end to a clevis shaped support member 38.

The spring steel wire part 40, of the Bowden wire 28, extends through opening 14 in the elastomeric mandrel 12, and end loop 42 joins to eyelet 44 in threaded bolt 46. The bolt is threadbly joined with nut 48 to press washer 50 against end 52 of the mandrel. The other end 54 of the spring steel wire extends through the mandrel and the spiral wire casing, and in the clevis shaped support member it is joined, in a manner similar to the joining of the first end, to a threaded bolt 56 having handles 58 on the end. A nut 60 with handles 62, screws onto the bolt and works against the clevis support member to apply or release tension to the spring steel wire. Nut 64 acts as a lock-nut.

In operation the handle 62 controls nut 60 to remove all tension from the spring steel wire 40; which places the elastomeric mandrel in the unexpanded position. Next the mandrel with covering layers is inserted into the tubing where it can negotiate elbows if required and the mandrel located with groove 20 at the end of the tubing 24b. Other tubing end 24a is then placed to abut the first tubing with joint 22 centered on the shallow groove 20. The handle 58 is then held while handle 62 is rotated to place tension on wire 40, and axially compress the mandrel. As the mandrel is axially compressed it creates a radial or diametrically expanding force to drive the outer covering layer against the inside of the tubing. This covering is then contacting the tubing throughout the length of the mandrel's diameter 16 except for the groove 20. The depth of the groove determines the amount of buildup of the underbead during welding of the tubing due to the layer and groove acting as a die or mold. Conventional tungston gas arc welding is then employed to effect girth welding of the joint. Care should be exercised to keep a molten weld puddle running ahead of the open arc, by adding filler metal as required. If the open arc impinges on the fiberglass outer sleeve through a "keyhole", or an area having excessive gap, local contamination of the weld area and weld expulsion occurs. After completing the welding the tension on the spring steel wire is removed, the mandrel relaxes and is then removed from the tubing.

In the embodiment shown in FIGS. 5-7, the elastomeric mandrel 68 is hollow. This mandrel has an outer periphery similar to mandrel 12, with large middle diameter 70 having a shallow circumferential groove 72, and smaller diameter ends 74a and 74b. An inner textile fiber sleeve covering 76 of ceramic fibers, and an outer textile fiber sleeve of fiberglass 78 surrounds the mandrel. These covers are held in place with wire loops 80a and 80b. The expansion of the mandrel to force the fiberglass sleeve against the inside ends of tubing 82a and 82b to determine underbead height is controlled by introducing a compressed fluid into the hollow mandrel. This pressurized fluid is introduced from outside the tubing through a line 84 that is preferably flexible to permit introducing the covered mandrel through bends in the tubing to be welded. The tubing is sealingly joined to the mandrel with a fitting 86. Compressed fluid from an outside source, not shown, goes through a pressure regulator valve 88, is controlled by a control valve 90, and then the fluid passes through the hose to control the mandrel.

In operation the deflated mandrel is introduced into tubing with groove 72 of the mandrel located under the joint 92 forward of the abutting tube ends 82a and 82b. Then compressed fluid preferably at about 2 to 3 p.s.i.g. is introduced into the mandrel to diametrically expand it and force the fiberglass sleeve against the abutting tubing ends. Pressure is maintained while the joint is girth welded, after which the fluid pressure is released causing the mandrel to contract, and permit its removal from the welded tubing.

The fiberglass sleeve acts as a mold to positively limit the buildup of the height of the underbead. Other contacting materials may be used but fiberglass is preferred as it is free from outgassing and does not contaminate the weld underbead.

We claim:
1. A device for controlling weld underbead height of aluminum tubular members comprising: a solid elastomeric mandrel with an axially located opening therethrough and the mandrel having a smaller diameter near each end than in the middle, a textile sleeve of ceramic fiber around the periphery of the mandrel, a textile sleeve of fiberglass fibers around the ceramic sleeve, a Bowden wire having one end of a spiral wire casing attached to one end of the elastomeric mandrel and the other end extending outside tubing to be welded and the wire attached at one end to a second end of the mandrel and the other end of the wire extending through and past the means outside the tubing for pulling on a spring steel wire to effect an axial compression to form a mold to control the underbead height of the weld.

2. A device for controlling weld underbead reinforcement height during girth welding of thin gage tubular aluminum comprising: an elastomeric mandrel having a shallow groove around the periphery to be located under a joint to be welded, a layer of ceramic textile fibers secured around the periphery of the elastomeric mandrel, a layer of fiberglass textile fibers covering the ceramic layer, means for radially expanding the elastomeric mandrel by exerting axially compressive forces on a solid mandrel to press the mandrel with covering layers against the inside of aluminum tubing to control the height of the underbead during welding, and the means for exerting axially compressive forces on the mandrel comprises: the mandrel having an axially located opening extending therethrough, a Bowden wire having an end of a spiral wire casing attached to one end of the mandrel and the wire having one end extending through and attached to the opposite end of the mandrel, and means for pulling on the wire.

3. A device for controlling weld underbead reinforcement height during girth welding of tubular members comprising: a solid elastomeric mandrel having an axially located opening extending through the mandrel, an inner coating of ceramic textile fibers and an outer coating of fiberglass textile fibers around the periphery of and fastened to the mandrel, means for axially compressing the mandrel to diametrically expand the mandrel with coatings against the inside surfaces of abutting tubular members to be welded together, a shallow groove in the mandrel located to be under the weld, and the means for axially compressing the elastomeric mandrel comprises: a spiral wire casing extending from and joined to one end of the mandrel to a point outside the tubing to be welded, a wire inside the casing with one end of the wire extending through and joined to a closed end of the mandrel and the opposite end of the wire extending beyond the casing, and means for moving the wire with respect to the casing to accomplish the axial compression of the mandrel.

* * * * *